United States Patent [19]

Mascotte

[11] Patent Number: 4,945,703

[45] Date of Patent: Aug. 7, 1990

[54] MEANS FOR MOUNTING DECORATIVE SCROLLS TO A FRAME

[76] Inventor: Lawrence L. Mascotte, 9106 SE. 82nd, Portland, Oreg. 97266

[21] Appl. No.: 445,282

[22] Filed: Dec. 4, 1989

[51] Int. Cl.$^5$ .............................................. E04C 2/42
[52] U.S. Cl. ..................................... 52/663; 52/665
[58] Field of Search ............... 52/507, 663, 665, 456; 49/50

[56] References Cited

U.S. PATENT DOCUMENTS

| | | | |
|---|---|---|---|
| 3,293,817 | 12/1966 | MacGregor | 52/456 |
| 3,745,615 | 7/1973 | Obesreich | 52/663 X |
| 4,016,699 | 4/1977 | Hurvitz | 52/507 X |

Primary Examiner—Carl D. Friedman

[57] ABSTRACT

A mounting means for mounting a scroll member onto a bar member comprises a mounting member secured in a channel in a section of the scroll member. The mounting member has resilient leg members that terminate in hook-shaped free ends extending outwardly from an inner surface of the scroll member. A securing member has hook-shaped legs that are matable with the hook-shaped free ends when the scroll member is positioned on the bar member thereby causing the resilient leg members to frictionally engage respective sides of the bar member securing the scroll member in position thereon.

14 Claims, 2 Drawing Sheets

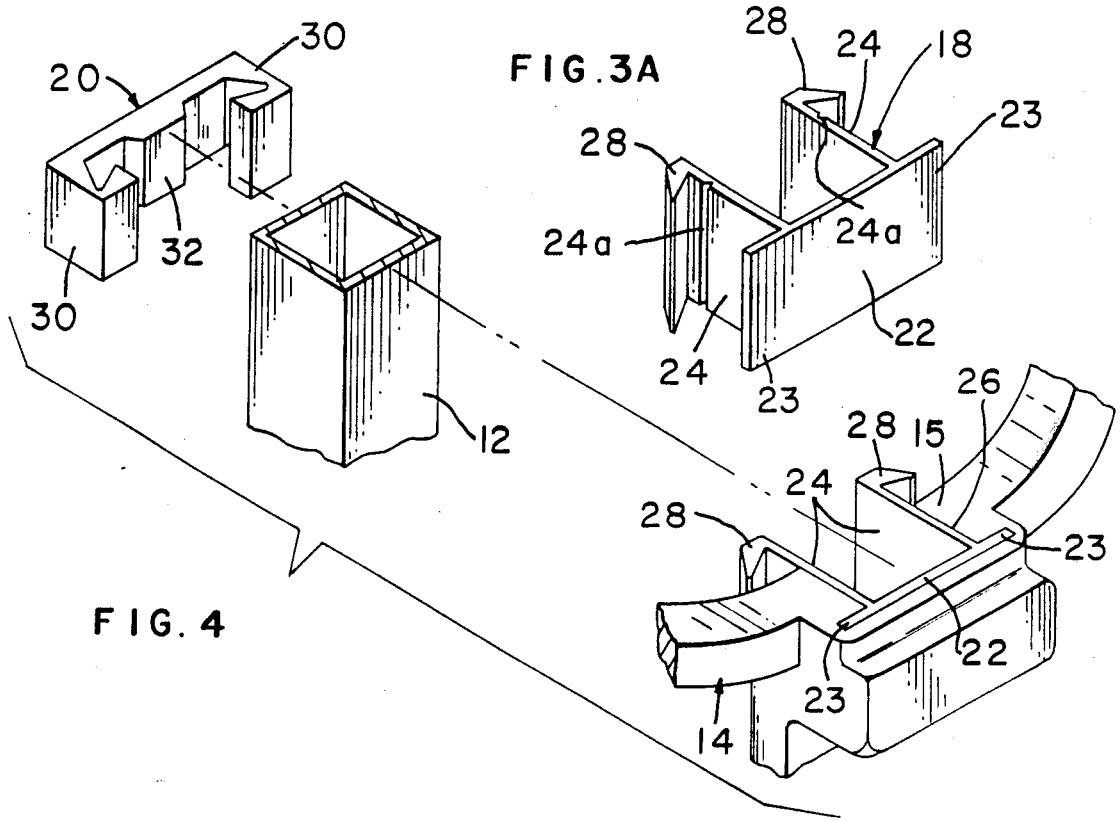
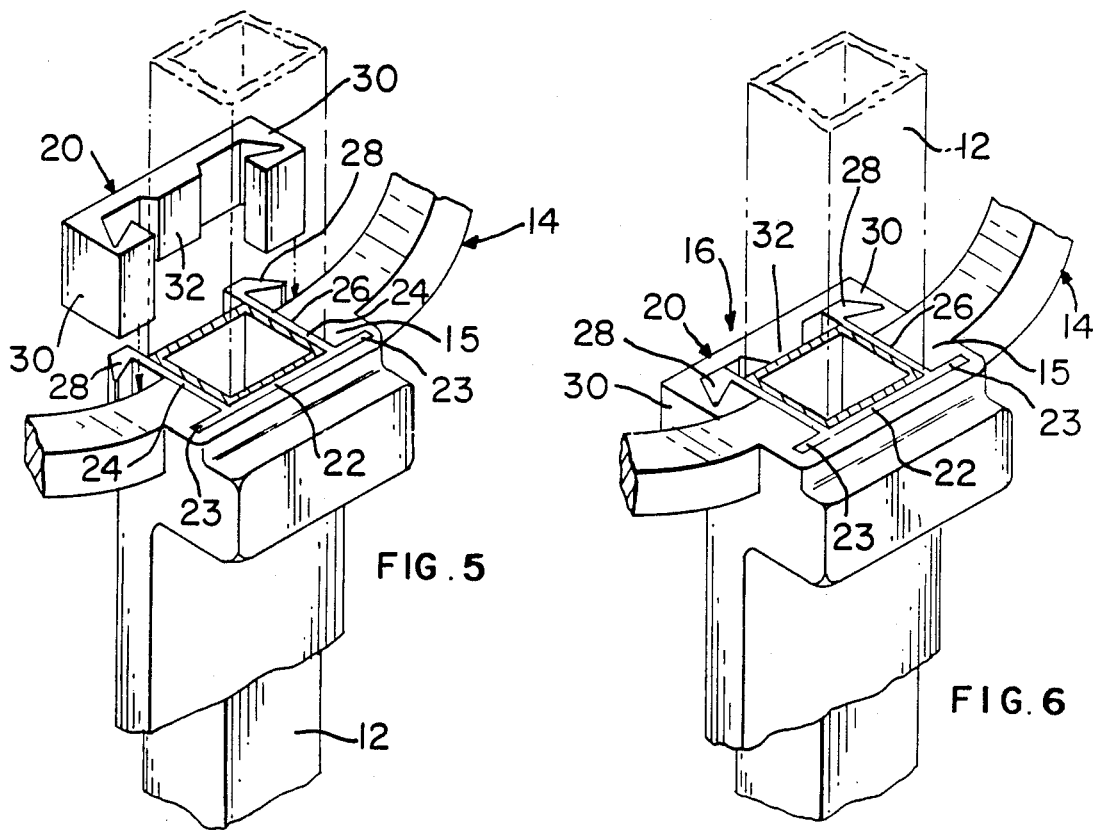

MEANS FOR MOUNTING DECORATIVE SCROLLS TO A FRAME

FIELD OF THE INVENTION

This invention relates to a mounting means and more particularly to a means for mounting decorative scrolls to a frame such as a metal bar of a frame of a storm door or wrought iron railing.

BACKGROUND OF THE INVENTION

Metal scrolls are mounted onto metal bars of a storm door or wrought iron railing to decorate the storm door or wrought iron railing. These decorative scrolls are either welded to the metal bars or secured to the metal bars by rivets, metal screws or bolts. Welds burn the paint and can be unattractive as well as very difficult to paint. Rust can then occur. If the metals of the bars and decorative scrolls are different, galvanic action can occur in the weld areas which will result in corrosion and be unsightly. Galvanic action will generally also take place when screws or bolts are used. In order to minimize such action, periodic maintenance is required. It is easier to paint the scrolls and the storm door or wrought iron railing the same color rather than the scrolls being a different color from that of the storm door frame or wrought iron railing. Thus, it is desirable to mount and secure scroll members onto bars without disturbing the paint.

SUMMARY OF THE INVENTION

According to the present invention, a U-shaped mounting member of metal having spring characteristics is secured within a metal scroll member. The hook-shaped free ends of resilient legs of the U-shaped mounting member extend outwardly from an inner surface of the scroll member. The scroll member is positioned onto a metal bar of a storm door frame or wrought iron railing with the U-shaped mounting member engaging the metal bar. A securing member has hook-shaped legs engaging the hook-shaped free ends of the legs of the U-shaped mounting member whereby the resilient legs frictionally engage the metal bar thereby securing the scroll member in position in the metal bar. A center section of the securing member includes a projection that engages the metal bar causing the hook-shaped legs to apply continuing pressure onto the hook-shaped free ends thereby assuring that the scroll member will be maintained in position on the metal bar.

BRIEF DESCRIPTION OF THE DRAWINGS

The invention is described hereinbelow by way of example with reference of the drawings of which:

FIG. 3a a perspective view of the mounting member.

FIG. 4 an exploded perspective view of the mounting and securing members of the mounting means sections of the metal bar and scroll member.

FIG. 5 shows the scroll member positioned on the metal bar prior to the securing member being mounted on the mounting member.

FIG. 6 is the same as FIG. 5 showing the scroll member secured in position on the metal bar.

DETAILED DESCRIPTION OF THE INVENTION

Figure 1:
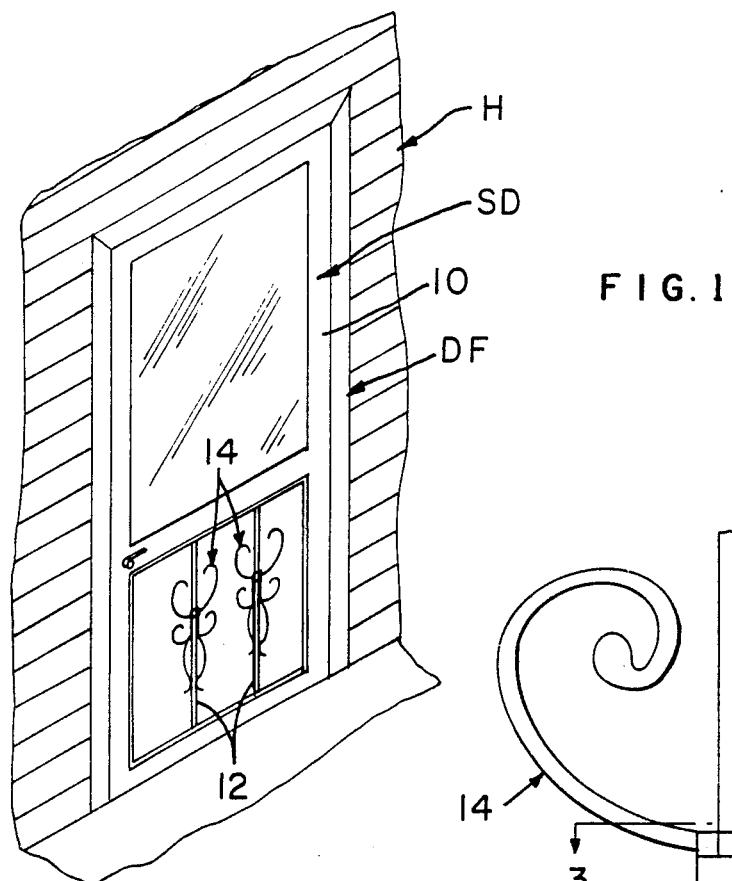
FIG. 1 is a respective view showing a storm door to which scroll members are secured.
Figure 2:
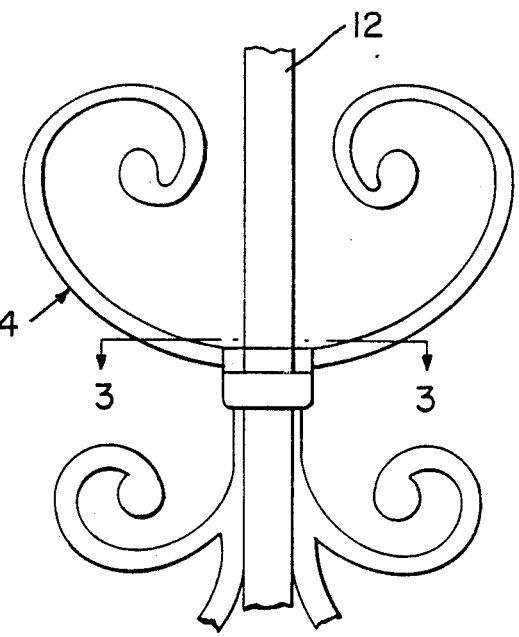
FIG. 2 is a part front elevational view showing a section of a metal bar and a section of the scroll member secured theret.

A storm door SD is shown in FIG. 1 hingedly mounted in a door frame DF of a house H. The storm door SD is of typical construction including a rectangular metal frame 10 having metal bars 12 which can be tubular or solid.

It is to be understood that the present invention is being described in conjunction with a storm door frame, but it can be used on wrought iron railings or any type of metal frame to which scroll members can be added to enhance the decorative aspects of the metal frame.

Scroll member 14 is secured onto bar 12 by a securing means 16. Scroll member 14 is generally cast from a suitable metal in a configuration of curved sections resulting in a desired decorative form. Securing means 16 includes a U-shaped mounting member 18 and securing member 20.

Mounting member 18 is formed from a metal having spring characteristics such as spring or stainless steel and includes a base 22 and resilient legs 24 which extend normally therefrom. Base 22 extends outwardly from each resilient leg 24 in the form of extensions 23 that are in the same plane as base 22.

Mounting member 18 is placed in a mold for casting scroll member 14 so that when scroll member 14 is cast from a suitable metal such as aluminum or other readily castable metal, securing member 18 is secured in position in section 15 via extensions 23 as shown in FIGS. 3–6.

Base 22 and resilient legs 24 form a channel 26 in section 15 with resilient legs 24 being free to move laterally within channel 26. Hook-shaped free ends 28 of resilient legs extend outwardly from the inner surface of scroll member 14.

Securing member 20 is molded from a suitable plastic material, preferably by extrusion and then cut to length. The sides of securing member 20 are in the form of hook-shaped legs 30 for matably receiving hook-shaped free ends 28 therein. An inwardly-directed projection 32 is located at the center of securing member 20.

With mounting member 18 secured in scroll member 14, it can be mounted onto bar 12 by positioning mounting member along bar 12 as shown in FIG. 5. It is to be appreciated that the spacing between resilient arms 26 is slightly greater than the width of bar 12. Also, scroll member 14 can be painted a color different from that of bar 12 prior to being mounted thereon.

Figure 3:
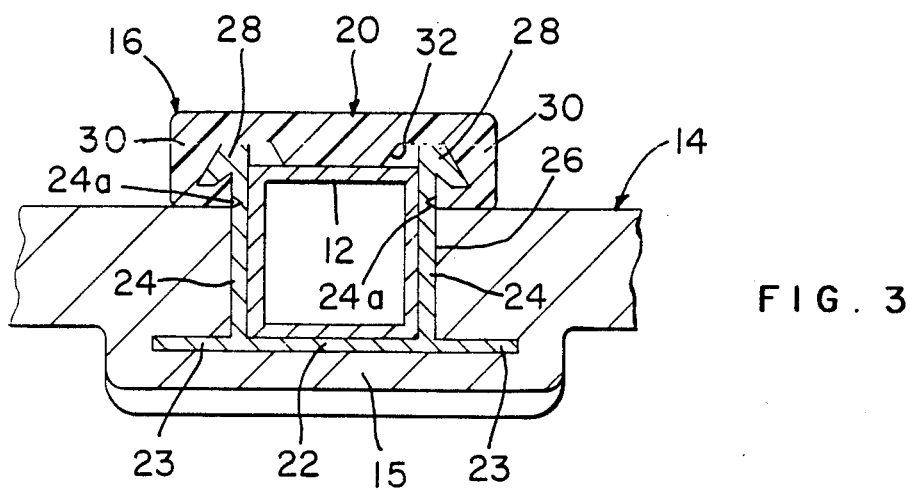
FIG. 3 a cross-sectional view taken along line 3—3 of FIG. 2.

Securing member 20 can then be moved along bar 12 so that hook-shaped legs 30 are matably engaged with hook-shaped free ends 28 of resilient legs 24 and projection 32 engages bar 12 as shown in FIGS. 3 and 6. The length of securing member 20 is substantially the same as that of mounting member 18 so that hook-shaped legs 30 engage all of hook-shaped free ends 28. Use of plastic material for securing member 20 allows it to be flexible, provides lubricity and does not scrape paint from bar 12.

The spacing between hook-shaped legs 30 is slightly less than that of hook-shaped free ends 28 so that when securing member 20 is mounted on mounting member 18, resilient legs 24 are resiliently urged into engagement with respective sides of bar 12 thereby frictionally maintaining scroll member 14 in the selected position on bar 12.

Depending on the size of scroll member 14 will dictate how many mounting means will be required to mount and secure it on bar 12.

The engagement of projection 32 with bar 12 stabilizes the forces between hook-shaped legs 30 and hook-shaped free ends 28 and places proper tension thereon as well as applying frictional force on bar 12. In the event it is desired to weld scroll member 14 onto bar 12, resilient legs 24 can include grooves 24a to enable hook-shaped free ends 28 to be broken off. Legs 24 can then be welded onto bar 12 thereby securing scroll member 14 thereon.

Grooves 24a are preferably located in outside surfaces of legs 24 adjacent the inside surface of scroll member 14 which acts as a bearing area to enable ends 28 to be broken from legs 24 when struck by a hammer.

By using the mounting means of the present invention to mount scroll members onto metal bars, the paint of the metal bars is not damaged which will minimize maintenance and any unsightly areas. The bars can be painted one color and the scroll members another color before the scroll members are mounted and secured onto the bars. This will enable the scroll members to be better painted. Scroll members could be easily replaced with different scroll members and seasonal scroll members could be used.

What is claimed:

1. Mounting means for mounting a scroll member onto a bar member, comprising:
   mounting member means secured within a channel of the scroll member and including resilient leg members for extending along respective sides of the bar member, said leg members having free ends extending outwardly from an inner surface of the scroll member, said free ends defining securing members; and
   securing means having securing legs matable with said securing members when said securing means is moved into engagement with said mounting member means thereby moving said resilient leg members into frictional engagement with the sides of the bar member and maintaining the scroll member in position on the bar member.

2. Mounting means as claimed in claim 1, wherein said securing members are hook-shaped.

3. Mounting means as claimed in claim 1, wherein said securing legs are hook-shaped.

4. Mounting means as claimed in claim 1, wherein said securing means includes projection means for engaging a respective surface of the bar member.

5. Mounting means as claimed in claim 1, wherein said securing members and said securing legs are intermatable hook-shaped members with the spacing between the securing legs being slightly less than that of said securing members.

6. Mounting means as claimed in claim 1, wherein said mounting member means is U-shaped with a base being secured to a bottom of the channel.

7. Mounting means as claimed in claim 6, wherein said base includes extensions that are embedded in said scroll member.

8. A scroll member for mounting onto a bar member, comprising:
   a section of the scroll member having a channel therein;
   mounting member means having resilient leg members disposed in said channel;
   means securing said mounting member means in said channel with said resilient leg members being free to move therein;
   free ends of said resilient leg members extending outwardly from a surface of said section containing said channel and being in the form of securing members; and
   securing means having securing legs being moved into matable engagement with said securing members when said scroll member is mounted on the bar member with the resilient leg members frictionally engaging respective sides of the bar member thereby securing the scroll member in position on the bar member.

9. A scroll member as claimed in claim 8, wherein said mounting member means is U-shaped with a base having extensions embedded in said section.

10. A scroll member as claimed in claim 8, wherein said securing members and said securing legs are intermatable hook-shaped members.

11. A scroll member as claimed in claim 10, wherein the spacing between said securing legs is slightly less than that of said securing members.

12. A scroll member as claimed in claim 8, wherein said securing means has a projection for engaging a respective surface of the bar member.

13. A scroll member for mounting onto a bar member, comprising:
   a section of the scroll member having a channel therein;
   mounting member means having leg members disposed in said channel;
   means securing said mounting member means in said channel with said leg members extending along respective sides of said channel; and
   free ends of said leg members extending outwardly from a surface of said section containing said channel and being in the form of securing members, said leg members having grooves adjacent said surface of said section enabling said free ends to be broken from said leg members.

14. A scroll member as claimed in claim 13, wherein said grooves are in outer surfaces of said leg members.

* * * * *